(No Model.)

A. H. JOHNSON.
GRAIN SPREADER FOR THRASHING MACHINES.

No. 262,184. Patented Aug. 1, 1882.

ATTEST:  
Edmond Brodhag  
Nowell Bartte

INVENTOR:  
pro Arthur H. Johnson,  
Johnson & Johnson  
Attys

UNITED STATES PATENT OFFICE.

ARTHUR H. JOHNSON, OF WOODLAND, CALIFORNIA.

GRAIN-SPREADER FOR THRASHING-MACHINES.

SPECIFICATION forming part of Letters Patent No. 262,184, dated August 1, 1882.

Application filed February 20, 1882. (No model.)

*To all whom it may concern:*

Be it known that I, ARTHUR H. JOHNSON, a citizen of the United States, residing at Woodland, in the county of Yolo and State of California, have invented new and useful Improvements in Grain-Spreaders for Thrashing-Machines, of which the following is a specification.

My invention relates to improvements in grain-feeders for thrashing-machines in which vibrating spreading-fingers are employed to spread the sheaves as they are fed to the cylinder, and thus cause the grain to enter the cylinder evenly, thereby facilitating the operation of thrashing and rendering such operation more effective in the separation of the grain.

The object of my improvement is to prevent the choking of the spreading-fingers—that is, to prevent the grain piling up as it is fed beneath the vibrating spreading-fingers and cause it to be kept down upon the feeder, which brings the grain from the stack, and which feeder is connected with and forms a continuation of the table of the thrashing-cylinder, so that there will be no interruption of the feed of the grain. This object is effected by combining with fingers vibrating back and forth within the grain, so as to spread it over the feeding-surface, fingers adapted to operate over and upon the grain with a patting or pressing action, so as to keep it down under the spreading action.

Figure 1:
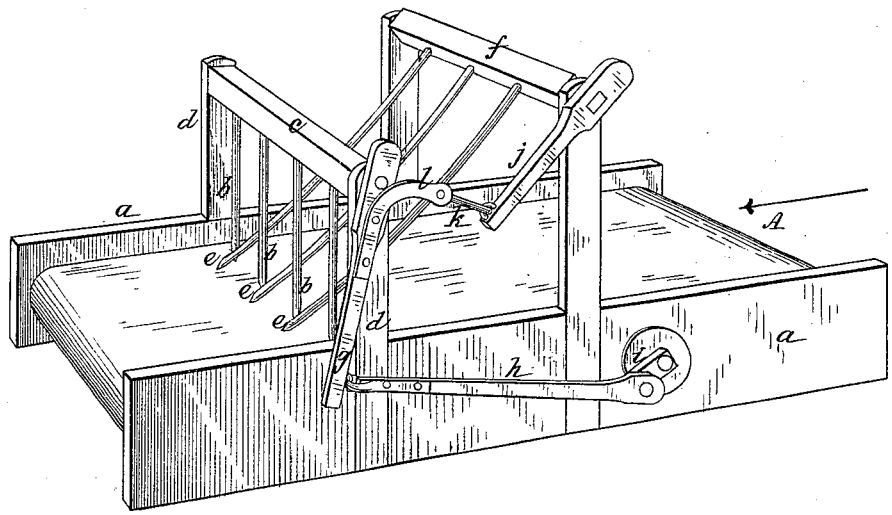
Figure 2:
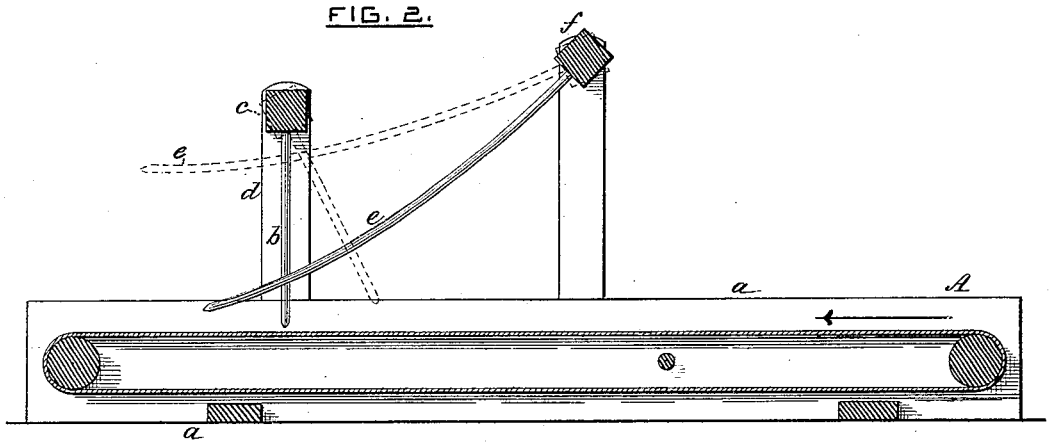

Referring to the accompanying drawings, Figure 1 represents a view in perspective of so much of a grain feeder and spreader as embraces my improvement; Fig. 2, a vertical section of the same.

It will be understood that the frame *a* supports and carries the feeding-belt, and that the grain is received from the stack at the end A and is delivered at the opposite end to the table of the thrashing-cylinder, and that the carrier or feeder is operated by belt from the thrashing-machine. Such a grain-feeder is well known, and need not be particularly described.

The spreading-fingers *b* are carried by a rock-bar, *c*, supported by studs *d d*, rising from the sides of the frame. These fingers hang down into the grain across the feeder and within a short distance of its surface, and they are vibrated back and forth by the rocking of their carrying-bar, so as to loosen and spread out the sheaf after the band has been cut and as the grain is fed along the carrier from the stack, so that it may pass into the cylinder in an evenly-spread condition.

The action of the spreading-fingers and the feeding movement of the grain causes it to pile up over the fingers and choke them, so that the feed is thereby made irregular, and it is necessary to press the grain down by hand to keep the spreading-fingers free. I have devised a vibrating regulator for this purpose adapted to vibrate over and above the grain and between the fingers of the spreader, so as to pat upon the grain as it is spread out, and lay it of even depth upon the feeder. This regulator consists of fingers *e*, secured in a rock-bar, *f*, rising from the frame in front of the spreading-fingers and extending in the direction of the feed of the grain and between the spreading-fingers, so as to vibrate up and down upon the grain as it fed beneath them and press it down at the point where it tends to pile up and choke. A convenient way of operating these pressing-fingers *e* is by connecting their rock-bar *f* to the rock-bar *c* of the spreading-fingers. The spreading-fingers are vibrated by a crank-arm, *g*, and pitman-connection *h* with a crank, *i*, of a shaft driven from the thrashing-machine, and the regulator-fingers are operated by a crank-arm and link-connection, *j k*, with an arm, *l*, on the crank-arm *g* of the spreader rock-bar.

In Fig. 2 the black lines show the regulator-fingers at their lowest descent and in the position in which their pressing action is made upon the grain, while the dotted lines show the position of the fingers when raised above the grain. The pressing-fingers I designate as a "regulator," because they serve to regulate the depth of the grain upon the feeder, and as connected for operation these fingers are vibrated so as to rise free of the grain when the spreader-fingers are vibrated rearward and in a direction against the feed of the grain, and to descend upon the grain when the spreader-fingers assume a vertical position in the grain. The regulator, however, may be operated separately, if desired, and its fingers are preferably curved, and so arranged as not to interfere with the feed of the grain beneath them.

I claim—

1. In a grain-spreader for thrashing-machines, the combination of the grain-carrier and the vibrating spreading-fingers with the vibrating regulating-fingers, whereby the grain is prevented from piling up as it is fed beneath the spreading-fingers.

2. In a grain-spreader for thrashing-machines, the combination of the grain-carrier, the spreading-fingers, and the vibrating regulating-fingers arranged to operate between the spreading-fingers and above the grain fed through said spreading-fingers, substantially as described, for the purpose specified.

3. The combination of the grain-carrier, the vibrating spreading-fingers, and the regulating-fingers, the crank-arm, and link-connections for co-operation in a grain-spreader, substantially as described, whereby the regulating-fingers will rise as the spreading-fingers are vibrated against the feed of the grain and will fall upon the grain as said spreading-fingers move with the feed of the grain.

In testimony whereof I have hereunto set my hand in the presence of two subscribing witnesses.

ARTHUR H. JOHNSON.

Witnesses:
J. B. FITZGERALD,
W. R. CRAIG.